United States Patent [19]

Gordon

[11] Patent Number: 5,636,892
[45] Date of Patent: Jun. 10, 1997

[54] MULTI-PURPOSE DEFLECTOR APPARATUS FOR A VEHICLE

[76] Inventor: Adrian D. Gordon, 9272 Byron Ave., Surfside, Fla. 33154

[21] Appl. No.: 416,636

[22] Filed: Apr. 5, 1995

[51] Int. Cl.$^6$ ............................................. B60J 1/20
[52] U.S. Cl. ............... 296/95.1; 296/152; 296/154
[58] Field of Search ........................... 296/95.1, 152, 296/154, 180.1, 180.2, 180.3

[56] References Cited

U.S. PATENT DOCUMENTS

| | | | |
|---|---|---|---|
| 2,206,793 | 7/1940 | Staubly | 296/95.1 |
| 2,796,289 | 6/1957 | Tocchetto | 296/95.1 |
| 5,186,511 | 2/1993 | Hwang | 296/95.1 |

Primary Examiner—Joseph D. Pape
Attorney, Agent, or Firm—Robert M. Downey, P.A.

[57] ABSTRACT

A deflector apparatus includes a shield having a top, a bottom, a forward leading edge, a rear trailing edge, opposite sides, a forward zone between the forward leading edge and a transverse center line, and a rearward zone between the transverse center line and the rear trailing edge. A mounting structure rotatably supports the shield above a vehicle windshield and roof about a transverse rotational axis extending between the opposite sides of the shield and parallel to the center line in the forward zone, allowing the shield to move about the axis, through a predetermined range, in response to a rotational force applied thereto. The rotational axis is located forward and above the line intersecting the roof and the top of the windshield. A biasing element urges the shield to a normally relaxed position upon removal of external downward forces to the rearward zone.

9 Claims, 5 Drawing Sheets

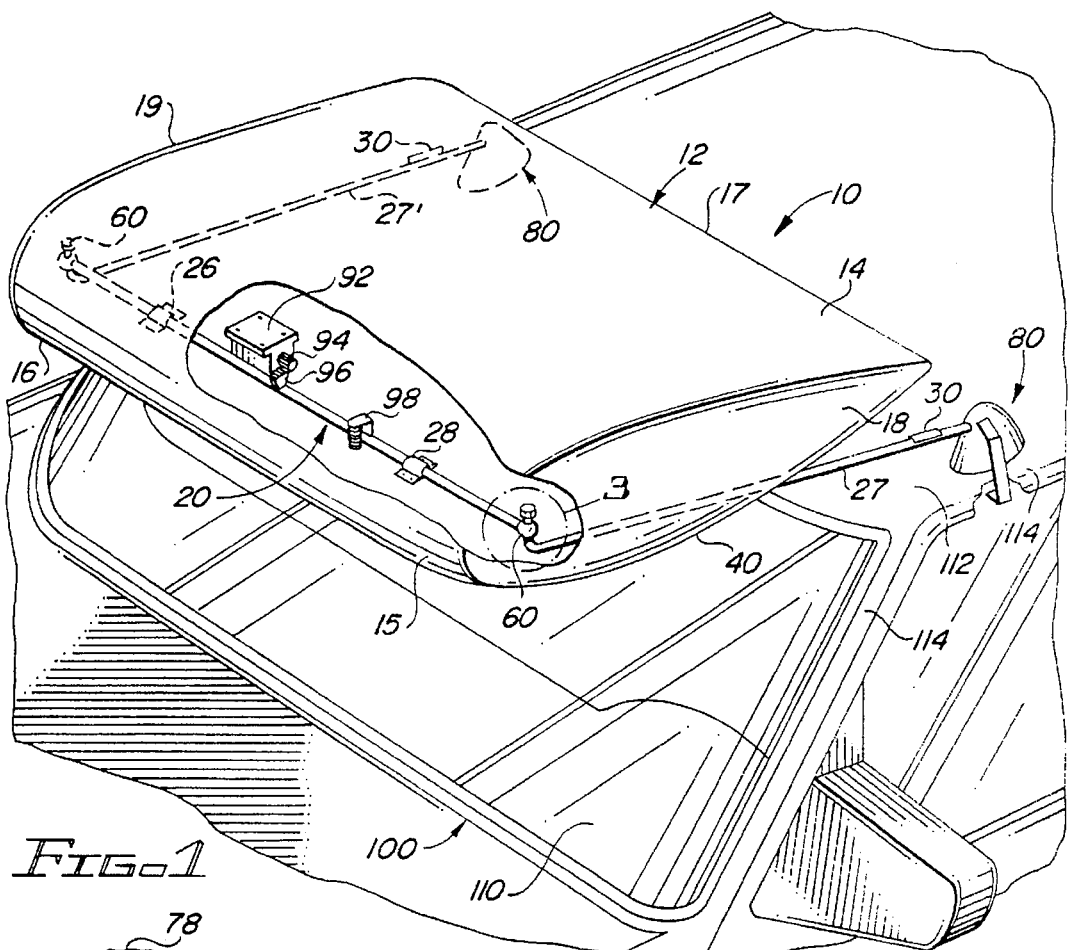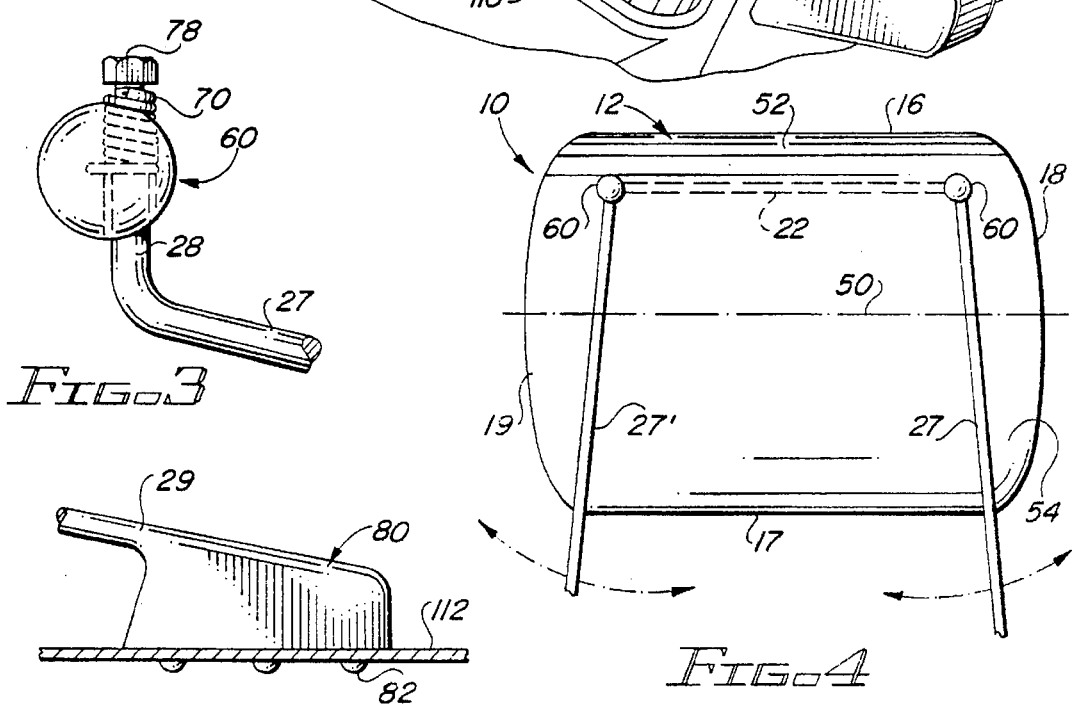

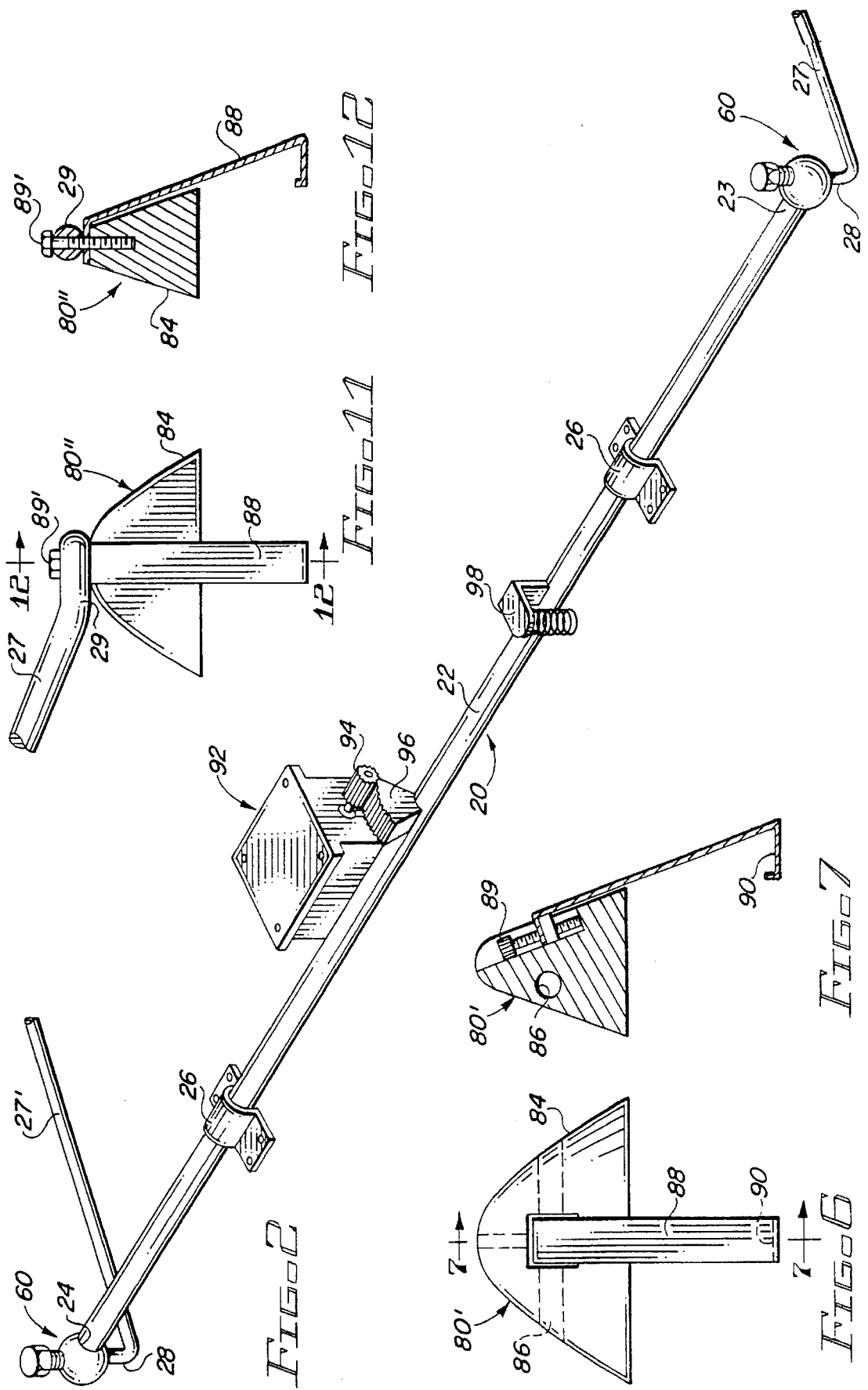

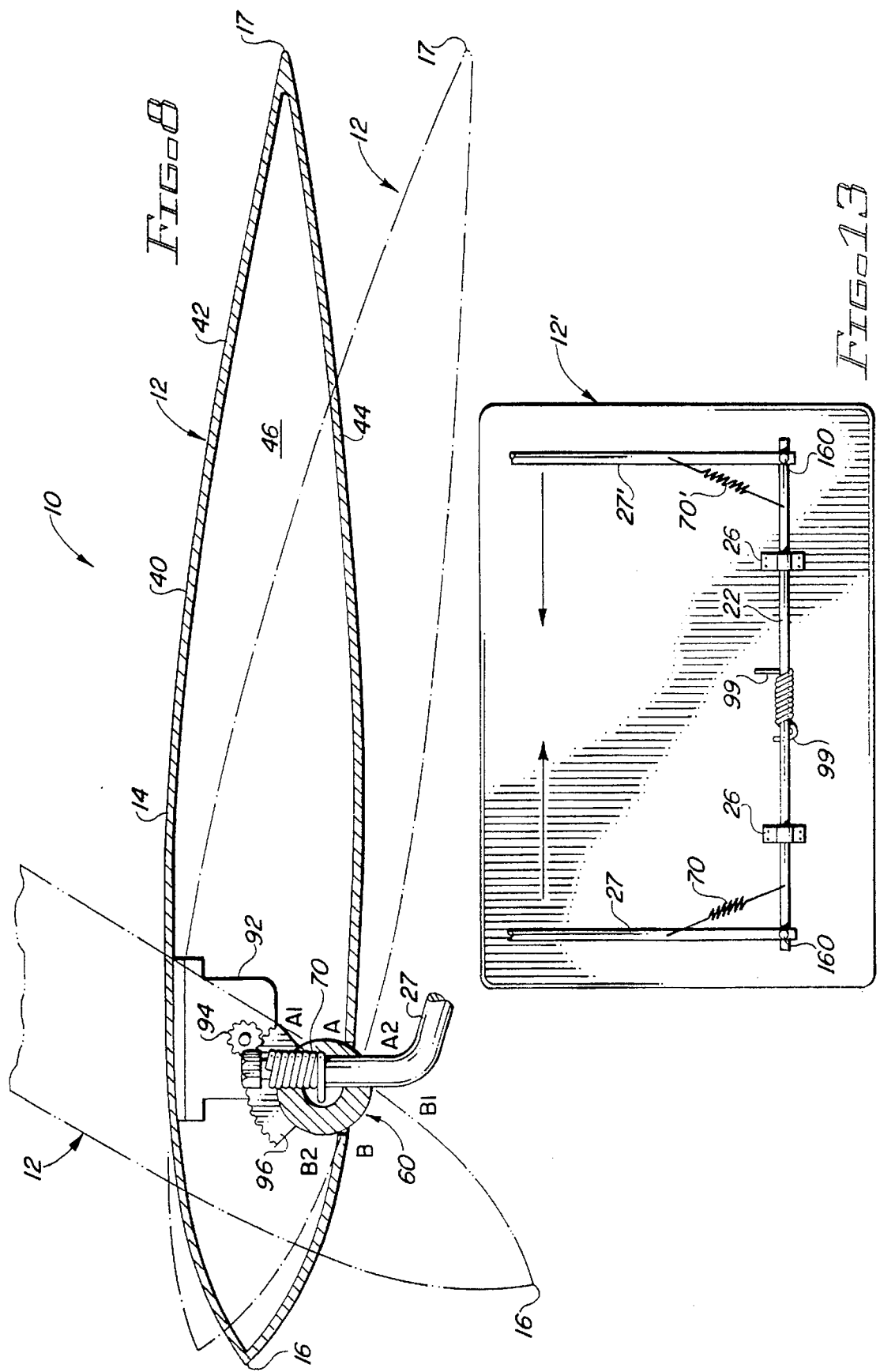

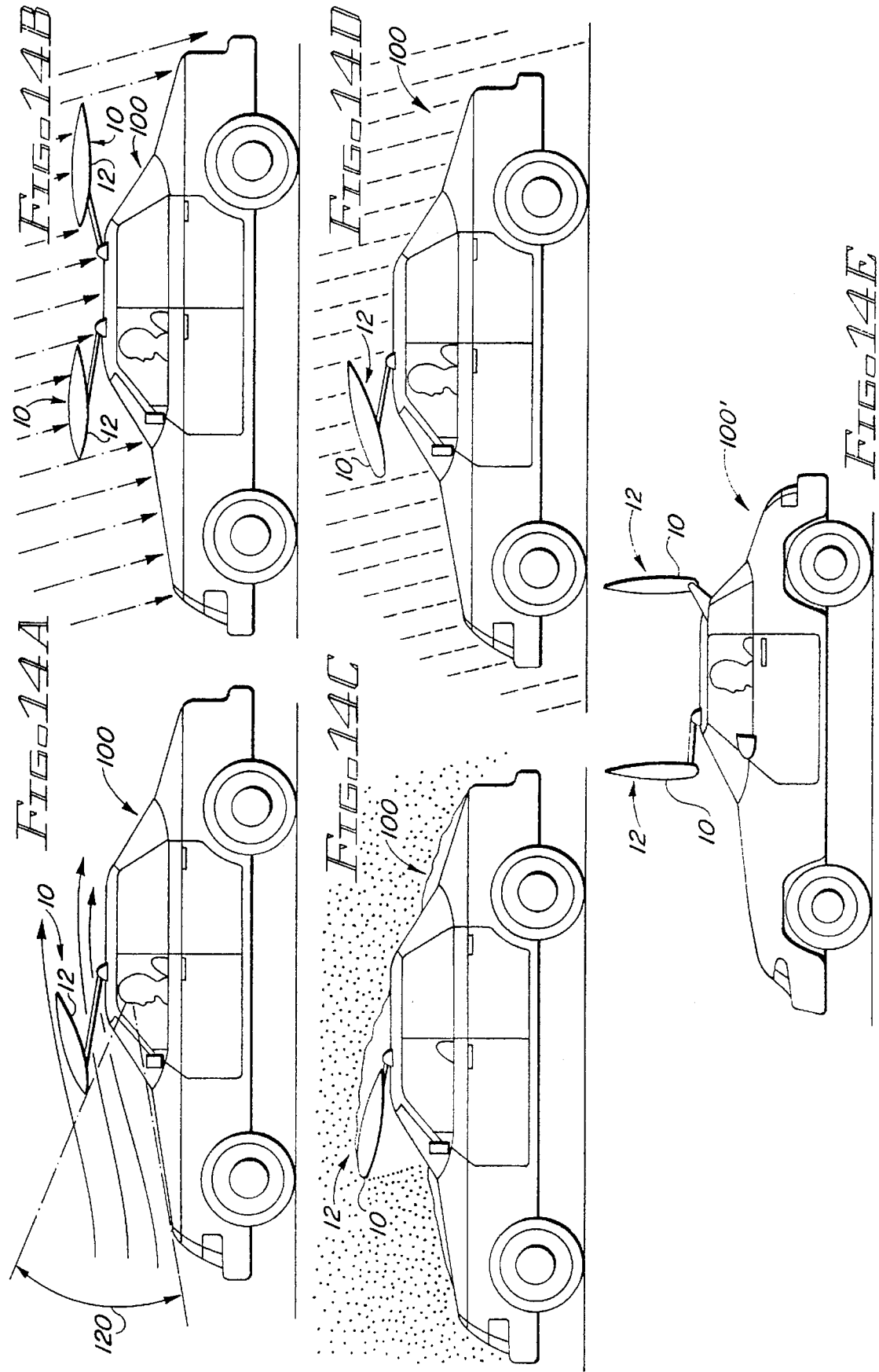

MULTI-PURPOSE DEFLECTOR APPARATUS FOR A VEHICLE

BACKGROUND OF THE INVENTION

1. Field of the Invention

The present invention relates generally to devices for deflecting rain, sunlight, snow, and glare from the windshield of a vehicle and, more particularly, to an aerodynamic deflector apparatus adapted to be mounted to a vehicle and including a shield movably supported above the windshield and a portion of the roof of the vehicle.

2. Description of the Related Art

The problem of reduced visibility when driving a vehicle is well known and may be attributable to many factors including direct sunlight in the driver's eyes, rain splattering on the windshield, snow and glare from sunlight shining off objects such as the dashboard. Furthermore, in colder climates, snow and ice frequently accumulate on the vehicle's windows while at rest, requiring the windows to be scraped clear before driving.

Virtually all vehicles are equipped with windshield wipers to remove rain water and snow from the windshield when occupants are in the vehicle. However, conventional wipers only remove rain from the windshield, after the rain has struck the windshield, resulting in periodic impairment of visibility between each stroke of the wipers. In heavy rain conditions, the driver's visibility is almost totally obscured, even with the use of wipers, requiring many drivers to pull the vehicle off to the side of the road until the rain subsides. In fact, a large number of vehicle accidents are the result of reduced visibility in heavy rain conditions, even with the use of modern day windshield wiper systems.

Most vehicles are further provided with sun visors within the vehicle interior which are adapted to be flipped down by the driver or passengers to shield direct sunlight from the eyes. However, sun visors, to be effective, must extend substantially downward from the top edge of the windshield to block sunlight when the sun is low in the sky. And, while conventional sun visors of this type are somewhat effective in shielding sunlight from the eyes of the vehicle driver and passengers, they substantially reduce the driver's line of sight, thus, reducing visibility. To address this problem, some vehicles are equipped with exterior sun visors which protrude from the vehicle roof forwardly of the windshield. Exterior sun visors are, to some extent, effective in shading the vehicle interior and reducing glare from the sun's rays. However, exterior sun visors are generally not sufficient to block rain and snow from the windshield, especially during movement of the vehicle. Further, these structures are fixedly mounted on the vehicle exterior, interfering with airflow over the windshield and roof of the vehicle, and thus inducing drag which results in substantially reduced fuel efficiency. Furthermore, exterior visors reduce the forward visibility of the driver, resulting in a "driving through a tunnel" sensation.

Over the years, there have been numerous devices proposed to address the problem of reduced visibility to the driver of a vehicle resulting from rain and sunlight. Examples of such devices are disclosed in the Hwang U.S. Pat. No. 5,186,511; Chen, No. 4,950,020; Newman, No. 4,229,035; Francis, No. 3,481,644; Huber, No. 3,957,301; and Kamp, No. 3,152,832. The various devices set forth in these patents are intended to serve as an external windshield sun shade or weather shield for automobiles, most being specifically structured for one purpose, either shading the vehicle interior or blocking rain from the windshield. All of the devices disclosed in these patents reduce the field of view and fail to provide an aerodynamic structure specifically adapted to minimize drag on a moving vehicle.

Accordingly, there is still a need in the automobile industry for an aerodynamic deflector apparatus which is specifically structured to provide multiple functions including blocking rain and snow from the windshield of a moving vehicle, shading sunlight and glare from the vehicle interior and occupant's eyes, preventing snow and ice from accumulating on the windshield (and optionally the rear window) while the vehicle is at rest and further providing a means for selectively inducing drag to the vehicle to supplement the conventional braking system.

SUMMARY OF THE INVENTION

The present invention is directed to an aerodynamic deflector apparatus for use on a vehicle and being specifically structured to provide multiple functions including: promoting visibility in all weather conditions; selectively inducing drag in an emergency braking situation in order to augment and/or supplement the vehicle's braking system; reducing heat load inside and eventually reducing A/C usage and fuel consumption; protecting the windshield from hail; protecting the dashboard from damage from exposure to sunlight; and further providing means for mounting and supporting objects such as fog lights, antennas, sign advertisements, heat overlayers, A/C condenser, etc. while maintaining a complete field of view.

The aerodynamic deflector apparatus of the present invention includes a shield having a top side, a bottom side, a forward leading edge, and a rear trailing edge. A mounting assembly movably supports the shield in a preferred position above the windshield and a portion of the roof of the vehicle. The shield is movably supported by the mounting assembly so that the shield is movable about a transverse axis extending between opposite sides. A biasing element, such as a spring, yields to external downward forces on the rear zone of the shield and urges the shield to a normally relaxed, passive orientation upon removal of the external forces. The shield may further be collectively rotated about the axis by a motor to a fixed inclined position, with the rear edge raised upwardly relative to the forward edge and vehicle roof. In this manner, the apparatus may be used to induce drag on the vehicle in emergency braking situations to supplement or replace the conventional braking system. Further, the top surface of the shield may be provided with a sign, such as an advertisement, which is visible when the rear edge is raised to orient the shield in a generally vertical position.

The shield further functions to block snow and rain from the windshield while the vehicle is at rest, holding the snow on the top surface and roof of the vehicle and thus, preventing the snow from accumulating on the windshield. In this instance, the weight of the snow accumulating on the top surface of the shield causes the rear trailing edge to move downwardly relative to the forward leading edge, either resting on the mounting assembly or roof of the vehicle so that the accumulating snow is directed towards the roof.

Accordingly, with the foregoing in mind, it is a primary object of the present invention to provide an aerodynamic deflector apparatus for use on a vehicle in order to promote visibility through the vehicle windshield (and optionally the rear window) in all weather conditions, whether the vehicle is moving or at rest.

It is a further object of the present invention to provide an aerodynamic deflector apparatus, as described above, and including means to rotatably support a shield structure in a preferred orientation above the windshield and roof of a vehicle.

It is still a further object of the present invention to provide an aerodynamic deflector apparatus for use on a vehicle and which is specifically structured to perform multiple functions including: shielding the windshield from rain and snow, while the vehicle is moving or at rest; shielding the vehicle interior and occupant's eyes from sunlight and glare; selectively inducing drag to supplement the vehicles braking system; protecting the dashboard from sun damage; protecting the windshield from hail; reducing heat load inside and thereby reducing A/C and fuel consumption; providing a mounting structure for accessories such as fog lights heat exchangers; and antennas; and further providing a means for advertising, while maintaining a complete field of view.

These and other objects and advantages of the present invention will be more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the aerodynamic deflector apparatus of the present invention shown mounted to the roof and supporting roof frame structure of a vehicle in a preferred operative position relative to the vehicle's windshield and roof;

FIG. 2 is an isolated view, illustrating a first preferred embodiment of a shield supporting assembly of the present invention;

FIG. 3 is an isolated view of an inner attachment joint, taken from the area indicated as 3 in FIG. 1;

FIG. 4 is a diagrammatic illustrating movement of support arm members of the shield supporting assembly;

FIG. 5 is an isolated view, in partial section, illustrating one embodiment of a mounting bracket for fixedly and permanently mounting the apparatus to the roof of a vehicle;

FIG. 6 is an isolated side elevation of another embodiment of a mounting bracket specifically structured for removable mounting of the apparatus to a vehicle;

FIG. 7 is a sectional view taken along line 7—7 of FIG. 6;

FIG. 8 is a side elevation, in partial section, showing a shield assembly in various positions in phantom, to illustrate a range of movement thereof;

FIG. 11 is an isolated side elevation of a preferred mounting bracket for use in combination with the embodiment of FIG. 10 for mounting the apparatus to the vehicle;

FIG. 12 is a sectional view along the line 12—12 of FIG. 11; and

FIG. 13 is a bottom plan view of the embodiment of FIG. 10 illustrating a shield supporting assembly mounted to a bottom of the shield;

FIG. 14A is a side elevation showing the shield assembly attached to the forward portion of an automobile roof so that the shield is positioned over the front windshield and illustrating the deflector apparatus in a passive mode while the vehicle is moving with the shield serving as a sun shade;

FIG. 14B is a side elevation showing the deflector apparatus attached both the forward and rearward portions of an automobile roof to shield both the front windshield and rear window thereof;

FIG. 14C is a side elevational view illustrating the deflector apparatus being used in a passive mode, shielding the front window and preventing snow from accumulating thereon;

FIG. 14D is a side elevational view illustrating the deflector apparatus used in a passive mode while the vehicle is moving to shield the front windshield from rain, sleet or snow; and FIG. 14E is a side elevational view showing the deflector apparatus attached to both the forward and rear roof portions of a sports car with the shields disposed in an active mode to assist with braking by inducing drag while also increasing traction of the front tires of the vehicle on the road surface.

Like reference numerals refer to like parts throughout the several views of the drawings.

DETAILED DESCRIPTION OF THE PREFERRED EMBODIMENTS

Figure 10:
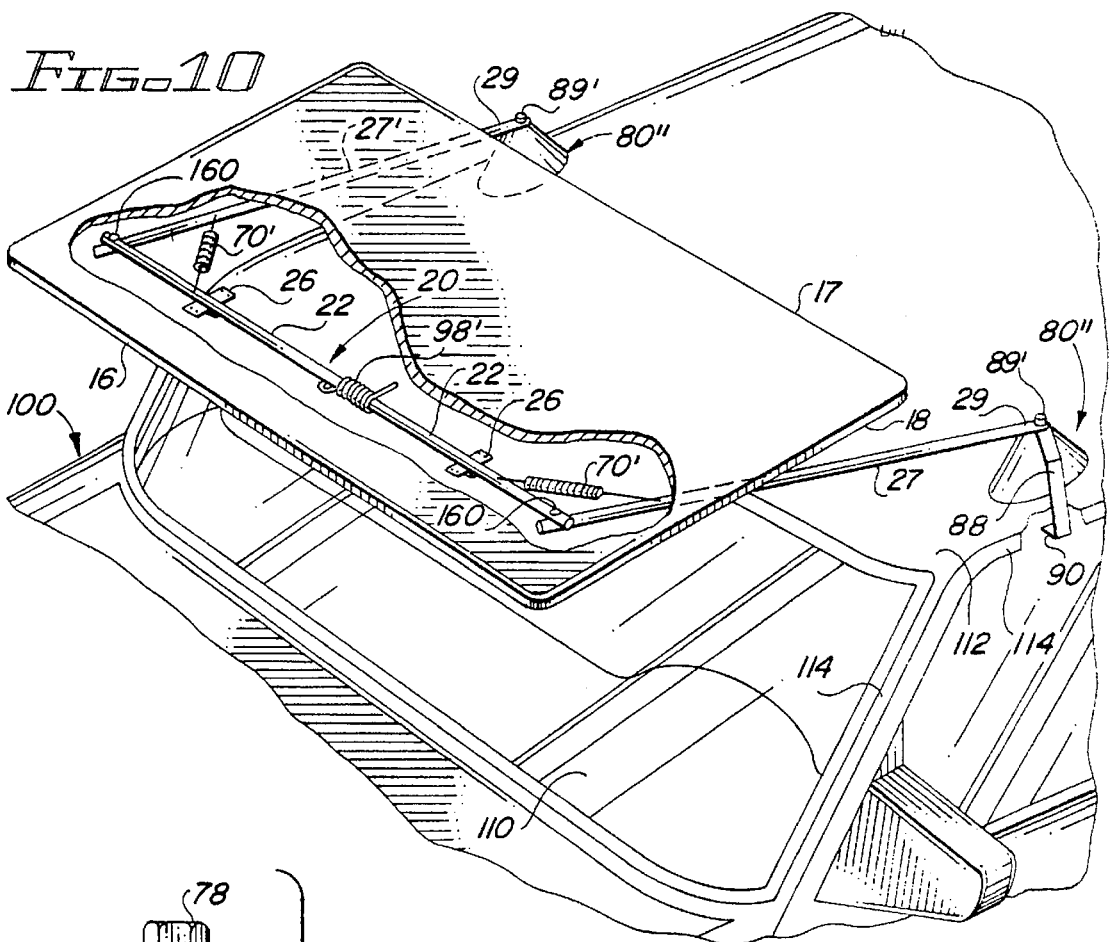
FIG. 10 is a top perspective view of a second preferred embodiment of the deflector apparatus of the present invention.

Referring initially to FIGS. 1–9c, there is illustrated the component parts of a first preferred embodiment of the aerodynamic deflector apparatus, generally indicated as 10.

Referring initially to FIG. 1, the aerodynamic deflector apparatus 10 includes a shield 12 including a top 14, a bottom 15, a forward leading edge 16, a rear trailing edge 17, and opposite sides 18, 19. The apparatus further includes a shield supporting assembly 20 structured and disposed for rotatably supporting the shield 12 at a preferred position above a windshield 110 and roof 112 of a vehicle 100, as seen in FIG. 1. Mounting brackets 80 are provided for mounting the shield supporting assembly 20 to the vehicle 100.

As best seen in FIGS. 1–8, in a first preferred embodiment, the shield 12 is comprised of a housing 40 aerodynamically formed and configured in the shape of an air foil and including a top half 42, a bottom half 44, and a hollow interior 46.

The shield supporting assembly 20 is best illustrated in FIGS. 1 and 2 and includes a transverse axle 22 rotatably attached to an inner surface of the lower half 44 within the hollow interior 46 of the shield housing 40. The axle 22 includes opposite first and second ends 23, 24. The axle 22 is mounted to the inner surface of the lower half 44 of the shield housing 40 by bushings 26 specifically structured to permit relative rotational movement of the shield 12 about the axle 22. Accordingly, when mounted to the vehicle 100, as seen in FIG. 1, the shield 12 is permitted to move about the axle 22 in response to forces applied to the shield 12. In a passive mode, the shield is caused to move or tilt in response to forces from airflow when the vehicle is moving, as illustrated in FIG. 14A. Ordinarily, this will result in the rear trailing edge 17 moving upwardly and the forward leading edge 16 moving downwardly to conform with the direction of airflow over the vehicle's windshield 110 and roof 112. In this instance, as shown in FIG. 14A, the shield 12 serves as a sun shade to block sunlight from a driver's eyes, while still maintaining a sufficient field of view for the driver, as indicated by arrows 120 in FIG. 14A.

Referring to FIG. 4, the shield 12 includes a center line 50 defining a forward zone 52 between the center line and the leading edge 16 and a rearward zone 54 between the center line 50 and the trailing edge 17. The rotational axis, defined by the transverse axle 22, is disposed in parallel relation to the center line 50 in the forward zone 52, preferably closer to the leading edge 16 than to the center line 50.

In the passive mode, the shield 12 further serves to catch snow and rain, on the top 14 thereof, while the vehicle is at rest, as illustrated in FIG. 14C. The weight of the snow accumulating on the top 14 results in downward movement of the trailing edge 17, as best seen in FIGS. 8 and 14C, moving from A-B from position A2-B2 as illustrated in phantom lines, with the trailing edge 17 resting on cushions 30.

Figure 9A:
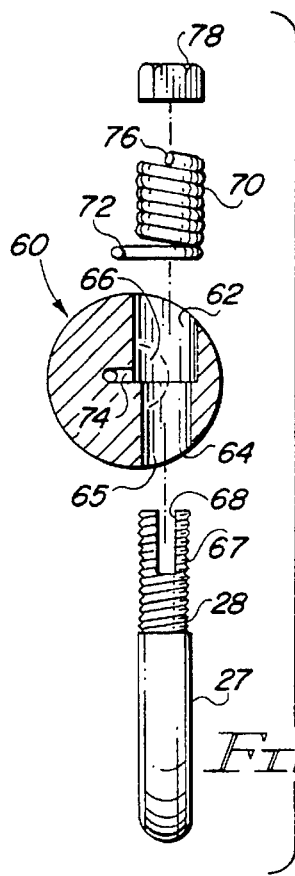
FIGS. 9a–9c each show an isolated view of the attachment joint of FIG. 3 in more detail.
Figure 9B:
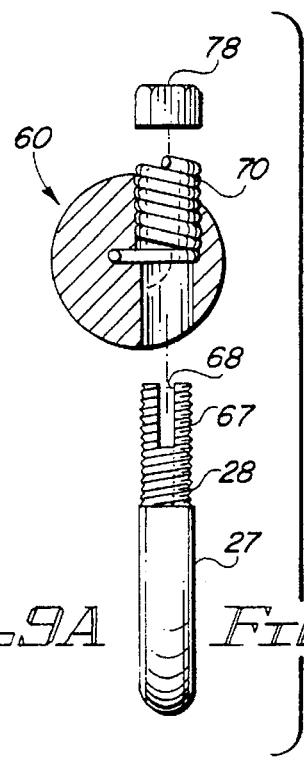
Figure 9C:
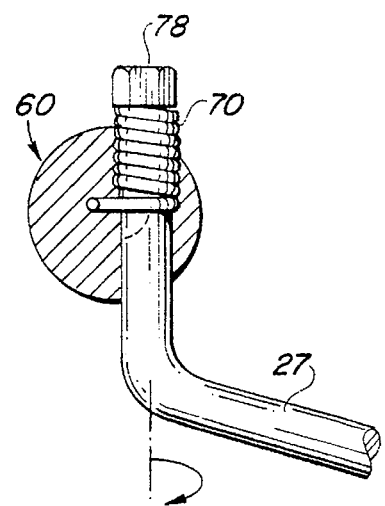

The shield supporting assembly 20 further includes oppositely disposed support arm members 27, 27' each including a proximal end 28 and a distal end 29. The proximal ends 28 of the supporting arm members 27, 27' are each movably attached to a respective one of the opposite ends 23, 24 of the axle 22. To facilitate movable attachment of the arm members 27, 27' to the axle 22, the first preferred embodiment includes a ball joint 60, best illustrated in FIGS. 3 and 9a–9c. Each of the ball joints 60 is provided with a horizontal bore 62 adapted for fixed attachment of the respective opposite ends 23, 24 of the axle 22 therein, so that the ball joints 60 remain fixed to the opposite ends 23, 24. The ball joints 60 are further provided with a vertical bore 64 including a lower portion 65 and an upper portion 66. The upper portion 66 of the bore 64 is larger in diameter than the lower portion 65 in order to accommodate a spring 70 therein. As seen in FIGS. 9a–9c, the proximal end 28 of the support arm members 27, 27' are provided with threads 67 and a slot 68. To attach the proximal end 28 of the support arm members 27, 27' to the opposite ends 23, 24 of the axle 22, via the ball joints 60, the spring 70 is first placed within the upper portion 66 of the vertical bore 64, as shown in FIG. 9b. The spring 70 is seated and held in position with the upper portion 66 by fitting a lower distal extension 72 of the spring 70 within a corresponding notch 74 formed within the ball joint 60 at the lower end of the upper portion 66. Once a spring 70 is seated and held in position within the upper portion 66, the threaded proximal end 28 of the supporting arm member 27 is passed through the lower portion 64 of the bore 65 and through the center of the spring 70, exiting the top of the spring 70 so that an upper distal extension 76 of the spring 70 falls within the slot 68 on the proximal end 28. A nut 78 is thereafter secured to the proximal end 28 to maintain the spring 70 on the proximal end 28 within the upper portion 66 of the ball joint 60 and to further prevent the support arm member 27, 27' from falling out of the ball joint 60. With the lower and upper distal extensions 72, 76 of the spring 70 secured within the ball joint 60 and slot 68 respectively, the spring 70 is prevented from rotating within the ball joint 60 upon swinging movement of the support arm members 27, 27'. Further, the attachment of the upper distal extension 76 to the proximal end 28 results in a recoil energy being stored in the spring 70 upon outward swinging movement of the support arm members 27, 27', as indicated by the broken arrows in FIG. 4. Accordingly, the spring 70 serves to urge the arm members 27, 27' inwardly in the direction indicated by the solid arrows in FIG. 4. A second function of the spring 70 is to isolate and absorb vibrations from the shield to the support arms.

The distal ends 29 of the arm members 27, 27' attach to a mounting bracket member 80, for mounting to the roof 112 and/or roof support frame structure 114 of the vehicle 100. The mounting bracket 80 may be of a type adapted for fixed, permanent attachment to the roof 112, as seen in FIG. 5, wherein the distal end 29 of the support arm members 27, 27' is formed with the bracket 80, with the bracket 80 being secured to the roof 112 by grommets, rivets, or other like fasteners 82 extending through the roof 112. In this case, the recoil energy stored in the spring is not necessary.

Alternatively, the apparatus 10 can be movably mounted to vehicles 100, after market, using adjustable brackets 80', as shown in FIGS. 6 and 7. In this instance, the removable, adjustable brackets 80' include a main body 84 having an elongate configuration to promote stability on the roof surface 112. The body 84 includes a horizontal bore 86 extending therethrough and adapted for snug, fitted attachment of the proximal end 29 of the respective support arm members 27, 27'. A clamping strap 88 is adjustably fitted to an outboard side of the body 84 being adjustable by a threaded screw member 89. Rotation of the screw member 89 serves to move a lower hooked end 90 of the clamping strap 88, wherein the lower hooked end 90 is adapted to be fitted under the frame structure 114 in the vehicle's door opening or the rain gutter, so that upon adjustment of the screw member 89, the clamping strap 88 is caused to be tightened to apply downward pressure of the body 84 on the top roof surface 112. The clamping force of the clamping strap 88, coupled with the inward force exerted on the arm members 27, 27' by the spring 70 serves to hold the bracket assembly 80' on the roof 112 and frame structure 114 of the vehicle 100, maintaining the shield 112 in the preferred position, as seen in FIG. 1.

As described earlier, in the passive mode, the shield 12 is able to rotate about the axle 22 through a predetermined range of movement in response to rotational forces applied thereto, such as from airflow or the weight of snow, leaves, or other debris which accumulate on the top 14.

The shield 12 is further movable in an active mode through the use of a motor 92 mounted to an under side surface of the upper half 42 of the shield housing 40, within the housing interior 46. The motor 92 includes a drive gear 94 positioned and disposed to intermesh, in driving engagement, with a gear portion 96 on the axle 22. Accordingly, upon activation of motor 92 and rotation of drive gear 94, the drive gear 94 drivingly engages gear portion 96 resulting in movement of the shield 12 through a range of movement, from a normally relaxed position A-B to a fully inclined position A1-B1, with the trailing edge 17 raised considerably higher than the leading edge 16, as shown in FIG. 8. Movement to the inclined position, using motor 92, may be desirous in order to assist with braking of the vehicle 100', as shown in FIG. 14E, by inducing drag while also creating a downward force on the forward end of the vehicle to increase traction of the front tires on the road surface.

The shield supporting assembly 20 further includes a spring element 98 under a predetermined amount of compression and being structured to urge the shield 12 to a normally relaxed position, as indicated by the solid line drawing in FIG. 8, at position A-B. The spring element 98 is of a specific compression to yield to the externally applied rotational forces on the top 14 of the shield 12, such as from as weight applied to the top surface of the shield 12 snow or debris), beyond a predetermined threshold force level. Upon removal of the external rotational forces, the spring element 98 urges the shield 12 back to the normally relaxed position.

Referring to FIGS. 10–13, there is illustrated a second preferred embodiment of the present invention. The embodiment illustrated in FIGS. 10–13 is of the same general principal as that earlier described, but is designed for construction at a lower cost. As seen in FIG. 10, the shield 12' is generally a flat planar member which may be of an aerodynamic configuration. The axle 22 mounts to the bottom 15 of the shield 12'. The supporting arm members 27, 27' are of simpler construction and are simply attached at the opposite ends 23, 24 of the axle 22 by means of a pivot pin 160. The spring element 98', for urging the shield 12' to the normally relaxed position, may simply be of a simple spring design having opposite extensions 99, one extension engaging the bottom 15 of the shield 12', and the other fitted into the axle 22. Further, simple spring members 70', attaching the between axle 22 and opposite supporting arm members 27, 27', are used to urge the arm members 27, 27' inwardly to promote mounting of the apparatus 10 on the vehicle, as earlier described. Finally, the mounting bracket 80" is of a simplified construction, wherein the distal end 29 of the supporting arm members 27, 27' attaches to the top of the body 84 of the mounting bracket 80" using the screw element 89 which further facilitates adjustable movement of the clamping strap 88, as earlier described.

While the invention has been shown and described in what is considered to be practical and preferred embodiments, it is recognized that departures may be made within the spirit and scope of the following claims which, therefore, should not be limited except within the Doctrine of Equivalents.

Now that the invention has been described,

What is claimed is:

1. A deflector apparatus for use on a vehicle having a windshield, a rear window and a roof including a supporting frame structure, said deflector apparatus comprising:

a shield including a top, a bottom, a forward leading edge, a rear trailing edge, and opposite sides, and said shield further including a forward zone defined between said forward leading edge and a transverse center line extending between said opposite sides and a rearward zone defined between said transverse center line and said rear trailing edge, a transverse axle rotatably attached to said shield, in said forward zone, and extending between said opposite sides parallel to said transverse center line, said axle including opposite first and second ends and defining an axis, said shield being rotatable about said axis from a normally relaxed position through a predetermined range of movement in response to rotational forces applied thereto, first and second support arm members each including a distal end and a proximal end, said support arm members being movably attached at said proximal ends to a respective one of said first and second opposite ends of said axle and being swingable relative thereto through a predetermined range of movement, spring means for urging said distal ends of said support arm members inwardly toward one another, attachment means for attaching said apparatus to the roof of the vehicle and including first and second bracket members structured for attachment to the roof of the vehicle and being further structured for removable, supported receipt of said distal end of a respective one of said support arm members, and biasing means for urging said shield to said normally relaxed position upon removal of a downward external force on said rearward zone.

2. A deflector apparatus as recited in claim 1 wherein said attachment means is structured and disposed to position and support said shield above the windshield and the roof with said forward leading edge positioned above and forward of a top peripheral edge of the windshield.

3. A deflector apparatus as recited in claim 2 wherein said attachment means is further structured to position and support said shield above the windshield and roof with said axis positioned and disposed forward of and above the top peripheral edge of the windshield.

4. A deflector apparatus as recited in claim 1 wherein said shield includes an outer housing having an upper half and a lower half enclosing a hollow interior thereof, said housing being aerodynamically formed and configured as an air foil.

5. A deflector apparatus as recited in claim 4 wherein said axle extends through said hollow interior of said shield housing and is rotatably attached to an inner surface of said lower half within said hollow interior.

6. A deflector apparatus as recited in claim 5 further including motor driven rotation means supported within said hollow interior of said shield housing for rotating said shield about said axle to select fixed positions throughout said predetermined range.

7. A deflector apparatus as recited in claim 6 wherein said first and second brackets each include adjustable clamp means for releasably securing said brackets to the roof and frame structure of the vehicle.

8. A deflector apparatus as recited in claim 1 wherein said apparatus is attachable to the vehicle with said shield positioned and disposed above the rear window.

9. A deflector apparatus for use on a vehicle having a windshield with a top edge, said deflector apparatus comprising:

a shield including a top, a bottom, a forward leading edge, a rear trailing edge, and opposite sides, and said shield further including a forward zone defined between said forward leading edge and a transverse center line extending between said opposite sides and a rearward zone defined between said transverse center line and said rear trailing edge, a transverse axle rotatably attached to said shield, in said forward zone, and extending between said opposite sides parallel to said transverse center line, said axle including opposite first and second ends and defining an axis, said shield being rotatable about said axis from a normally relaxed position through a predetermined range of movement in response to rotational forces applied thereto, and biasing means for urging said shield to said normally relaxed position upon removal of a downward external force on said rearward zone.

* * * * *